United States Patent

Montpas

[15] 3,654,475

[45] Apr. 4, 1972

[54] LIGHT SENSING DEVICE HAVING A POLYHEDRAL REFLECTOR AND A PHOTOMULTIPLIER WITH SEGMENTED PHOTOCATHODE

[72] Inventor: Henri L. Montpas, Yardley, Pa.

[73] Assignee: Weston Instruments, Inc., Newark, N.J.

[22] Filed: Feb. 16, 1970

[21] Appl. No.: 11,529

[52] U.S. Cl. ................................250/203, 250/207, 250/220
[51] Int. Cl. ........................................G01j 1/20, H01j 39/12
[58] Field of Search ................................250/203, 207, 220

[56] References Cited

UNITED STATES PATENTS 2,921,757   1/1960   Houle ..............................250/203 X

*Primary Examiner*—James W. Lawrence
*Assistant Examiner*—T. N. Grigsby
*Attorney*—William R. Sherman, Donald H. Fidler, Stewart F. Moore and John P. Sinnott

[57] ABSTRACT

An illustrative embodiment of the invention combines a light position sensitive photoelectric device with a light beam splitting structure in order to indicate the position of the light source relative to the device's photocathode. Primary reflecting surfaces are used to split the incoming beam of light and thereby provide improved light transmission properties.

2 Claims, 2 Drawing Figures

PATENTED APR 4 1972　　　　　　　　　　　　　　　　3,654,475

INVENTOR.
Henri L. Montpas
BY John P. Sinnott
ATTORNEY

LIGHT SENSING DEVICE HAVING A POLYHEDRAL REFLECTOR AND A PHOTOMULTIPLIER WITH SEGMENTED PHOTOCATHODE

BACKGROUND OF THE INVENTION

1. Field of the Invention

This invention relates to optical systems and more particularly, to a combination reflecting system and segmented photocathode to indicate the position of light sources relative to the photosensitive material, and the like.

2. Description of the Prior Art

The industrial importance of equipment for producing signals in response to the relative movement of a light source has been demonstrated for example, in automatic star tracking devices for celestial navigation systems. In prior equipment it was customary to provide lens systems that divide an incoming beam of light into several individual rays of light. Separate photoelectric sensors responded to the respective light rays through the production of individual electrical signals that were related to the intensity of the incident rays. These signals were then processed, for instance, to control the position of a telescope relative to a star according to changes in the intensities of the received light rays.

Typically, as a star traverses the night sky, it moves out of the tracking sensor's optical field. The relative intensities of the light rays from the divided incoming beam of light change because of this shift in the relative position of the star under observation. Output signals from the individual photocathodes also change as the respective ray intensities change. These output signals may be processed to restore or change the relative positions of the light source and the sensor.

Often the light source under observation emits quanta in those portions of the visible spectrum that are readily absorbed or attenuated in the usual lens glasses. Absorption of this sort destroys, or at least degrades the quality of the photoelectric response. For example, if a star under observation is of a high order of magnitude, it will emit a faint, low intensity light. Light quanta in the ultraviolet portion of the star's spectrum are absorbed in the lens system and the loss of this part of star's "signal" will significantly reduce the available sensor input and thus decrease the efficiency of the entire tracking system.

Superficially, it might be assumed that this problem can be overcome through a proper choice of lens glass. Quartz is illustrative of the glasses that are transparent to ultraviolet radiation. Because, however, all except a few special glasses are substantially opaque to ultraviolet radiation, and the refractive indices needed to provide the desired optical effects might not be available in these ultraviolet transparent glasses, a fully satisfactory lens system often is not practical.

SUMMARY OF THE INVENTION

In accordance with the invention, primary surface reflectors are used to split an incoming beam of light into a group of light rays that are applied to respective photocathode surfaces. Primary reflectors, in which light is reflected from the surface, do not absorb incident ultraviolet quanta. This is in contrast to lenses. It also is in contrast to secondary reflectors, in which the light first must pass through a glass plate in order to reflect from a silvered mirror surface.

More particularly, the reflecting surfaces or facets of a highly polished polyhedron are optically aligned with respective photocathode segments. These segments form the light-sensitive surface of a photomultiplier tube of the sort described, for example, in U.S. Pat. No. 3,294,975 granted to H. G. Fleck on Dec. 27, 1966 for "Photo-Device With Segmented Photocathode." The polyhedron preferably has reflecting surfaces that are equal in number to the individual photocathode segments that are to be energized.

One embodiment of the disclosed invention has a right rectangular pyramidal reflector centrally disposed relative to four photocathode segments on the light-sensitive surface of a photomultiplier tube. An incident light beam passes through an aperture in a plate that is disposed over the entire beam-splitting and phototube assembly. The aperture, moreover, is in alignment with the apex of the pyramid to enable a centered, collimated or convergent beam of light to divide into four individual rays of equal intensity that are reflected from each of the four respective pyramidal surfaces. A set of four primary reflectors are spaced from, and in optical alignment, each with a respective reflecting facet on the pyramid. The reflecting surfaces on these spaced reflectors are spherically or plane ground and are highly polished. The spherical or plano surfaces reflect the incident light rays through a 90° angle to enable these rays to fall upon respective segments of the photocathode. Each photocathode segment produces a signal that characterizes the entire light spectrum in the incident ray. This reflecting system reduces light attenuation to a minimum and produces a more sensitive response to shifts in the relative position between the sensor and the light source than the light absorbing lens techniques that characterize the prior art.

Figure 1:
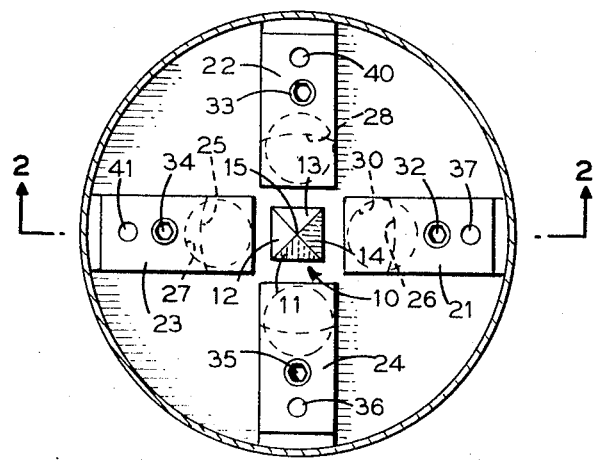
FIG. 1 is a plan view in full section of an exemplary embodiment of the invention, taken along the line 1—1 of FIG. 2, looking in the direction of the arrows.

For a more complete appreciation of the invention, a right rectangular pyramidal polyhedron 10 (FIG. 1) has plane reflecting facets 11, 12, 13 and 14, that are lapped, ground and polished to an accuracy λ/4, where λ is the wavelength of an incident beam of light. Preferably, the polyhedron is formed of hardened stainless steel.

After the facets 11 through 14 have been prepared in the foregoing manner, they are aluminized and may be subsequently treated with an ultraviolet transparent cost of magnesium fluoride. The fluoride coating provides a protective covering for the primary reflecting surfaces.

The polyhedron 10 terminates in an apex 15 that enables an incoming light beam 16 (FIG. 2) to divide into four individual light rays (not shown). The intensity of each of these rays is a function of the position and intensity distribution of the light beam 16 relative to the apex 15. If, for instance, the intensity of the incoming beam 16 is balanced relative to the apex 15, the facets 11 through 14 divide the beam equally to produce four rays of equal intensity. The field of view of the polyhedron 10 is restricted through a field stop 17. The stop 17 has a centrally disposed aperture 20 that is positioned in vertical optical alignment with the apex 15.

The field stop 17 blocks out or reduces the influence of stray light rays. Internal reflections within the field stop 17 that tend to interfere with the beam under observation, also can be reduced by means of a light absorbing coat of black paint on the field stop and on all other interior non-reflecting surfaces.

To redirect the four light rays reflected from the polyhedron to suitable photosensitive surfaces, spherically or plane ground reflectors 21, 22, 23 and 24 having primary reflecting surfaces 25 and 26 (FIG. 2) are secured in optical alignment, for instance with respective plane facets 12 and 14 (FIG. 1). The primary surfaces 25 and 26 reflect respective light rays vertically downward through a 90° angle through apertures 27 and 30 that are formed in a base plate 31. The spherically or plane ground reflectors, moreover, are secured to the base plate through screws 32, 33, 34 and 35 (FIG. 1) and locking pins 36, 37, 40 and 41.

A segmented photocathode photomultiplier tube 42, preferably of the type described in the aforementioned Fleck patent, is suitably secured beneath the base plate 31.

Figure 2:
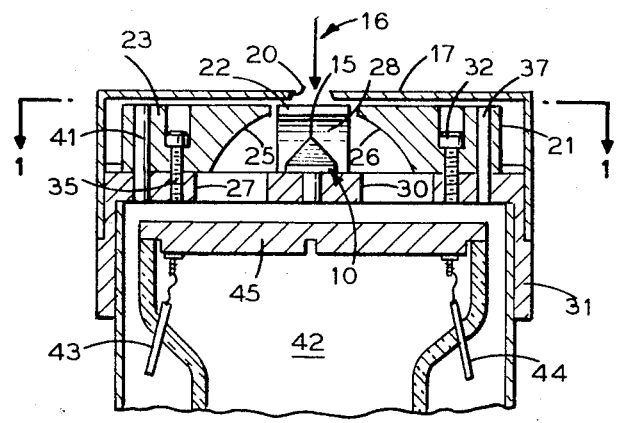
FIG. 2 is a side elevation in full section of the device shown in FIG. 1, taken along the line 2—2 of FIG. 1, and looking in the direction of the arrows.

Individual electrically isolated photocathode segments deposited on a faceplate 45 of the tube 42 are optically aligned with the light rays reflected through the apertures 27 and 30 (FIG. 2). As shown, the individual rays incident on their respective segments produce an electrical response in each of these segments that is related to the ray intensity.

In operation, a light beam 16 passes through the aperture 20 and is reflected from the individual facets 11 through 14 in four rays, each with an intensity that is in accord with the intensity distribution of the incoming beam 16 vis-a-vis the pyramidal apex 15.

The rays from the facets 11 through 14 (FIG. 1) are reflected once more by the respective primary reflecting surfaces of the spherically or plane ground reflectors 21 through 24. The spherically or plane ground reflectors reflect the light rays through the apertures 27 through 30 (FIG. 2) to the respective photocathode surfaces.

Conductors 43 and 44 (FIG. 2) are associated with the respective photocathode segments on the faceplate 45 of the photomultiplier tube 42. Ordinarily, the electrical signal produced on each segment through the photo effect of the incident light is observed through a segment scanning program that switches an energizing circuit to each of the segments in a predetermined sequence. Electrons, emitted from each of the photocathode segments under the control of the switching sequence, are accelerated up through a dynode structure (not shown) to an output circuit for further processing in accordance with the requirements imposed upon the system in which the sensor is used.

I claim:

1. A light sensing device comprising a polyhedron having a plurality of primary reflecting surfaces, a plurality of photo responsive devices optically aligned each with a respective one of said primary reflectors, said plurality of photo responsive devices further comprising a photomultiplier tube having a segmented photocathode, each of said segments being in optical alignment with a respective one of said primary reflecting surfaces and responsive to light rays redirected therefrom.

2. A star tracking sensor comprising a field stop having an aperture formed therein, a pyramidal primary reflector having a plurality of reflecting facets within said field stop, the apex of said pyramidal reflector being substantially in optical alignment with said aperture, spherically or plane ground primary reflectors spaced from said pyramidal primary reflector and being in optical alignment each with a respective reflecting facet of said pyramidal reflector, and a photomultiplier tube having a segmented photocathode, each of said photocathode segments being in optical alignment with a respective one of said facets and spherically or plane ground reflectors.

* * * * *